J. E. UHL.
Bit-Stocks.

No. 150,108.  Patented April 21, 1874.

WITNESSES.
Jacob Scheitlin
Walter Allen

INVENTOR.
Johann Ernst Uhl
By Knight Bros. Attorneys.

AM. PHOTO-LITHOGRAPHIC CO. N.Y. (OSBORNE'S PROCESS.)

UNITED STATES PATENT OFFICE.

JOHANN ERNST UHL, OF RENOVO, PENNSYLVANIA.

IMPROVEMENT IN BIT-STOCKS.

Specification forming part of Letters Patent No. 150,108, dated April 21, 1874; application filed September 27, 1873.

*To all whom it may concern:*

Be it known that I, JOHANN ERNST UHL, of Renovo, Clinton county, Pennsylvania, have invented certain Improvements in Bit-Stocks for Holding Bits, Drills, &c., of which the following is a specification:

This invention relates to certain improvements in braces, whereby the operation of boring or drilling in locations difficult of access is greatly facilitated; and it consists in, first, a device for setting and securing the two parts of a jointed shaft at any desired angle of obliquity, and steadying the brace while boring; second, a set-screw and conical bearing for the portions of the brace which are subjected to friction.

Figure 1:
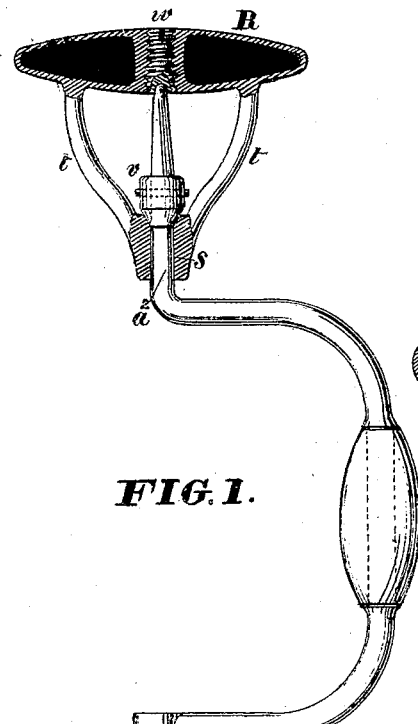
Figure 4:
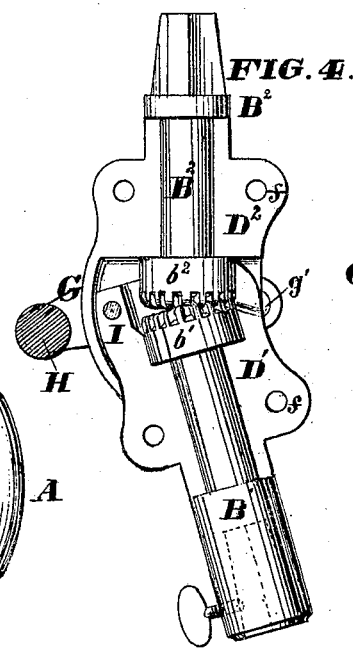
Figure 3:
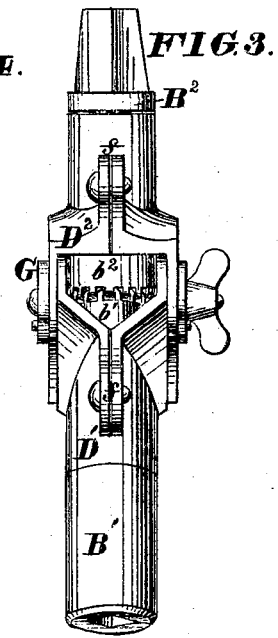
Figure 2:
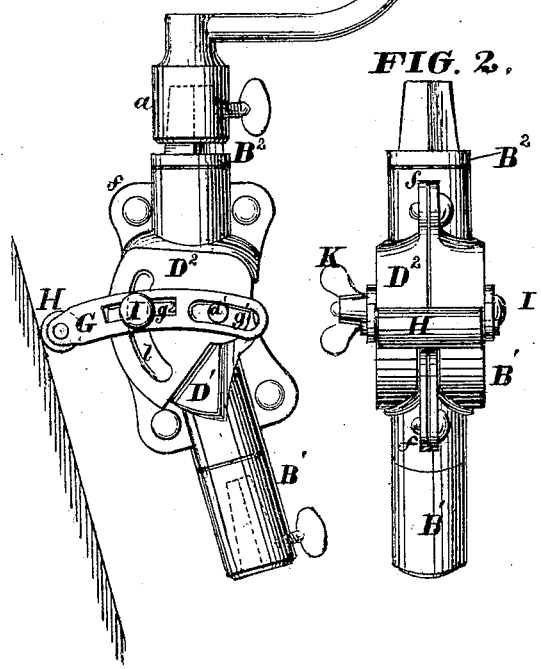
Figure 5:
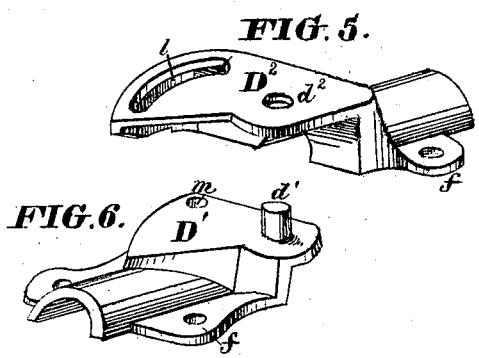
Figure 6:
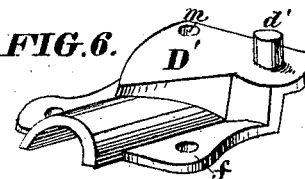

In the accompanying drawing, Figure 1 is a side elevation of my improved brace. Fig. 2 is a front view of the lower portion. Fig. 3 is a rear view of the same. Fig. 4 is a side view of the same, partly in section. Figs. 5 and 6 are detached views of parts hereinafter particularly referred to.

The handle A is of the ordinary construction, formed with a socket, $a$, to receive a bit when used in the ordinary manner. The universal joint or gearing consists of two shafts, $B^1$ $B^2$, on the upper and lower ends of which, respectively, are bevel-gears $b^1$ $b^2$, meshing into each other, and held in place and in engagement with each other by means of two coupling-shells, $D^1$ $D^2$, each of which shells is made in two halves. The lower shaft $B^1$ is provided with a socket to receive a bit, and the upper shaft $B^2$ has an angular projection for engagement with the socket $a$ in the handle A. The lower shell $D^1$ has formed on the inner side of each half a cylindrical portion for engagement with the corresponding portion of the shaft, and a shoulder and a concave portion for engagement with the gear-wheel $b^1$, the outer sides being flat, as shown in Fig. 6. The upper shell $D^2$ is of similar form, except that the inner side of each half is made flat for engagement with the outer sides of the shell $D^1$. The lower shell has a stud, $d^1$, projecting outward from each half for engagement with perforations, $d^2$, in the corresponding portions of the upper shell. Both halves of each shell are provided with flanges $f$, by which they are bolted together. The lower shell is first secured in place surrounding the shaft $B^1$. The shaft $B^2$ is then placed so that its gear $b^2$ will engage with the gear $b^1$ of the shaft $B^1$, and the shell $D^2$ is secured in place, surrounding the shaft $B^2$ by inserting the studs $d^1$ in the perforations $d^2$, and bolting the flanges together, thus hinging the shafts $B^1$ $B^2$ to each other in such a manner that the gears $b^1$ $b^2$ remain engaged without regard to the angle of inclination of the axis of the brace, so that a hole may be bored or drilled at any desired angle.

For guiding and steadying the bit during the process of boring or drilling, I employ the device shown most clearly in Figs. 1 and 2, consisting of two curved bars, G G, a roller, H, bolt I, and thumb-nut K. The bars G G each have two slots, $g^1$ $g^2$, formed in them, the slot $g^1$ being near the rear end of the bar, and the slot $g^2$ near the center, and have perforations formed near their front ends to receive the gudgeons projecting from the ends of the roller H. In the two halves of the shell $D^2$ near the outer edge are curved slots $l$, each describing an arc of a circle, of which the stud $d^1$ forms the center.

The bars G G are placed in position, with the studs $d^1$ passing through the slots $g^1$, the roller H is journaled in the ends of the bars, the bolt I is passed through the slots $g^2$ $l$, and through perforations $m$ in the shell $D^1$, and the thumb-nut K is placed on the threaded end of the bolt I. When the nut is tightened it holds the bars in the desired position, and also secures the shafts $B^1$ $B^2$ at any angle at which they may be placed by clamping them tightly between the bars. This device guides and steadies the bit during the process of boring by placing the roller H against a surface located at a right angle with the plane of the surface to be bored, as shown in Fig. 1. The distance between the axis of the bit and the plane of the bearing-surface of the roller is adjusted by loosening the nut K, placing the bars G G in the desired positions, and again tightening the nut.

The handle of the brace consists of a knob, R, from which braces $t$ project downward and concentrate in a ring, $s$, through which the shank $a^2$ passes, and also through another ring or collar, $v$, which collar is then secured to the shank by a pin passing through both. The collar $v$ is tapering on its under side, and rests in a corresponding seat in the ring $s$. The upper end of the shank rests in a depression in the point of a set-screw, $w$, which passes through the center of the knob R. When the bearing-surfaces become loose from friction, they are tightened up by means of the set-screw $w$.

What I claim as new, and desire to secure by Letters Patent, is—

1. The guiding and steadying device, consisting of the bars G G, roller H, bolt I, and nut K, employed in combination with the shafts $B^1$ $B^2$ and handle A, in the manner set forth.

2. The combination, in a bit-stock head, of the knob R, ring $s$, braces $t$, collar $v$, and set-screw $w$, substantially as and for the purpose shown and described.

JOHANN ERNST UHL.

Witnesses:
JOHN REILLEY,
N. L. IRWIN.